United States Patent
Murakami et al.

(10) Patent No.: US 8,079,598 B2
(45) Date of Patent: Dec. 20, 2011

(54) CHECK SEAL STRUCTURE FOR HYDRAULIC SHOCK ABSORBER

(75) Inventors: Tomoharu Murakami, Tokyo (JP); Chikatoshi Abe, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 551 days.

(21) Appl. No.: 12/289,131

(22) Filed: Oct. 21, 2008

(65) Prior Publication Data

US 2009/0108537 A1 Apr. 30, 2009

(30) Foreign Application Priority Data

Oct. 24, 2007 (JP) ................................. 2007-276085

(51) Int. Cl.
*F16F 9/36* (2006.01)
*F16J 15/32* (2006.01)

(52) U.S. Cl. ........ 277/552; 277/457; 277/353; 277/928; 188/322.17

(58) Field of Classification Search .................... 277/552, 277/928, 926, 648, 642, 353, 457; 188/322.17
See application file for complete search history.

(56) References Cited

U.S. PATENT DOCUMENTS

| | | | | |
|---|---|---|---|---|
| 2,754,136 A * | 7/1956 | Phillips | ........................... | 277/322 |
| 2,851,289 A * | 9/1958 | Pedersen | ........................ | 277/415 |
| 3,685,838 A * | 8/1972 | Malmstrom | ................... | 277/560 |
| 4,185,721 A * | 1/1980 | Karklins et al. | ......... | 188/322.17 |
| 4,344,631 A * | 8/1982 | Winn | ............................. | 277/552 |
| 4,527,673 A * | 7/1985 | Szcupak | ........................ | 188/269 |
| 4,678,064 A * | 7/1987 | Adachi et al. | .............. | 188/73.45 |
| 4,995,623 A * | 2/1991 | Wada et al. | .................... | 277/552 |
| 5,167,419 A * | 12/1992 | Robertson | ..................... | 277/552 |
| 6,029,980 A * | 2/2000 | Downes | ........................ | 277/552 |
| 6,457,870 B2 * | 10/2002 | Aizawa et al. | ................. | 384/477 |
| 6,622,832 B2 * | 9/2003 | Ashiba et al. | ............ | 188/322.17 |
| 6,644,446 B2 * | 11/2003 | Kachi et al. | .............. | 188/322.17 |
| 7,793,584 B2 * | 9/2010 | Murakami et al. | .............. | 92/168 |
| 2002/0063024 A1 * | 5/2002 | Ashiba et al. | ............ | 188/322.17 |
| 2006/0145426 A1 * | 7/2006 | Schroeder et al. | ............ | 277/559 |
| 2009/0151799 A1 * | 6/2009 | Ozawa | ........................... | 137/526 |

FOREIGN PATENT DOCUMENTS

JP 09-317914 12/1997
JP 11-108101 A * 4/1999

* cited by examiner

*Primary Examiner* — Alison Pickard
(74) *Attorney, Agent, or Firm* — Rabin & Berdo, P.C.

(57) ABSTRACT

A check seal (53) for discharging working oil scraped off a piston rod (3) by an oil lip (52b) into an oil pool (A) of a hydraulic shock absorber to an oil reservoir (R) is disposed on the outside of the oil pool (A). The check seal (53) comprises an annular seat surface (4d) and an annular lip (53a) seated resiliently on the seat surface (4d). The annular seat surface (4d) comprises an annular main rib (11) and an annular inner rib (12), both of which project toward the annular lip (53a), such that an annular groove (21) is formed between the main rib (11) and the inner rib (12). By providing a pressure introducing passage (12a) to introduce a pressure inside the inner rib (12) to the annular groove (21), the check seal (53) exhibits a high working oil discharging performance and a high working oil sealing performance.

8 Claims, 3 Drawing Sheets

CHECK SEAL STRUCTURE FOR HYDRAULIC SHOCK ABSORBER

FIELD OF THE INVENTION

This invention relates to a check seal for discharging working oil scraped off a piston rod by an oil lip to an oil reservoir of a double-tube type hydraulic shock absorber.

BACKGROUND OF THE INVENTION

JPH09-317914A, published by the Japan Patent Office in 1997, discloses a seal assembly disposed between a rod guide and an outer tube of a double-tube type hydraulic shock absorber for a vehicle.

The double-tube type hydraulic shock absorber comprises a cylinder, a piston housed in the cylinder, and a piston rod connected to the piston and projecting axially from the cylinder. The outer tube is provided on the outside of the cylinder. The rod guide supports the piston rod so as to be free to slide axially while closing openings of the cylinder and the outer tube.

The seal assembly is constituted by a rubber member in which a dust lip, an oil lip, and a check seal are integrally formed.

The dust lip slides on the piston rod to prevent dust from being brought into a cylinder when the piston rod contracts with respect to the cylinder. The oil lip slides on the piston rod so as to scrape working oil off the piston rod when the piston rod elongates with respect to the cylinder. The working oil scraped off the piston rod is temporarily stored in an oil pool formed around the piston rod. The check seal is provided in a position surrounding the oil pool and discharges working oil in the oil pool to an oil reservoir provided between the outer tube and the cylinder while preventing the working oil from flowing in the opposite direction.

The check seal comprises an annular lip extending obliquely outward and seated resiliently on an annular seat surface formed on the rod guide from above. A space on the outside of the check seal is connected to the oil reservoir via a drain port which penetrates the rod guide.

The lip of the check seal lifts up from the seat surface according to a pressure in the oil pool, and causes working oil in the oil pool to flow into the oil reservoir through a gap formed between the lip and seat surface, and the drain port. When the pressure in the oil reservoir becomes higher than the pressure in the oil pool, the check seal prevents working oil in the oil reservoir from invading the oil pool by keeping the lip in contact with the seat surface using a pressure in the oil reservoir.

The prior art proposes forming tongue and groove sections in the form of plural coaxial circles in the contact faces between the lip and seat surface such that engagement of the tongue and groove sections increases a contact area between the lip and seat surface, thereby increases a sealing performance against the invasion of working oil into the oil pool from the oil reservoir.

SUMMARY OF THE INVENTION

An increase in the contact area between the lip and seat surface, however, also increases an initial pressure required to lift the lip from the seat surface. When the contact area between the lip and seat surface is increased, therefore, the check seal does not open until the pressure in the oil pool is greatly increased.

Friction that the oil lip exerts on the piston rod depends on the pressure in the oil pool. When the pressure in the oil pool is greatly increased, therefore, the friction that the oil lip exerts on the piston rod greatly increases. Once the check seal opens, the high pressure in the oil pool is released rapidly to the oil reservoir, the pressure in the oil pool is rapidly decreased, and hence, the friction that the oil lip exerts on the piston rod rapidly decreases. Such a large variation in the friction exerted on the piston rod adversely affects the damping force characteristics of the hydraulic shock absorber and the riding comfort of a vehicle.

It is therefore an object of this invention to improve both the working oil discharging performance in one direction and the working oil sealing performance in the opposite direction of a check seal structure.

To achieve the above object, this invention provides a check seal structure for a hydraulic shock absorber for discharging working oil in an oil pool which temporally stores working oil scraped off a piston rod to an oil reservoir located outside the oil pool while preventing working oil from invading the oil pool from the oil reservoir. The check seal structure comprises an annular seat surface formed on the outside of the oil pool, an annular lip seated resiliently on the seat surface in a state where a tip of the annular lip points outward, a main rib having a circular form and projecting from the seat surface towards the annular lip, an inner rib provided on the inside of the main rib and projecting from the seat surface towards the annular lip such that the main rib and the inner rib form an annular groove, and a pressure introducing passage which introduces a pressure in the oil pool into the annular groove.

The details as well as other features and advantages of this invention are set forth in the remainder of the specification and are shown in the accompanying drawings.

DESCRIPTION OF THE PREFERRED EMBODIMENTS

Figure 1:
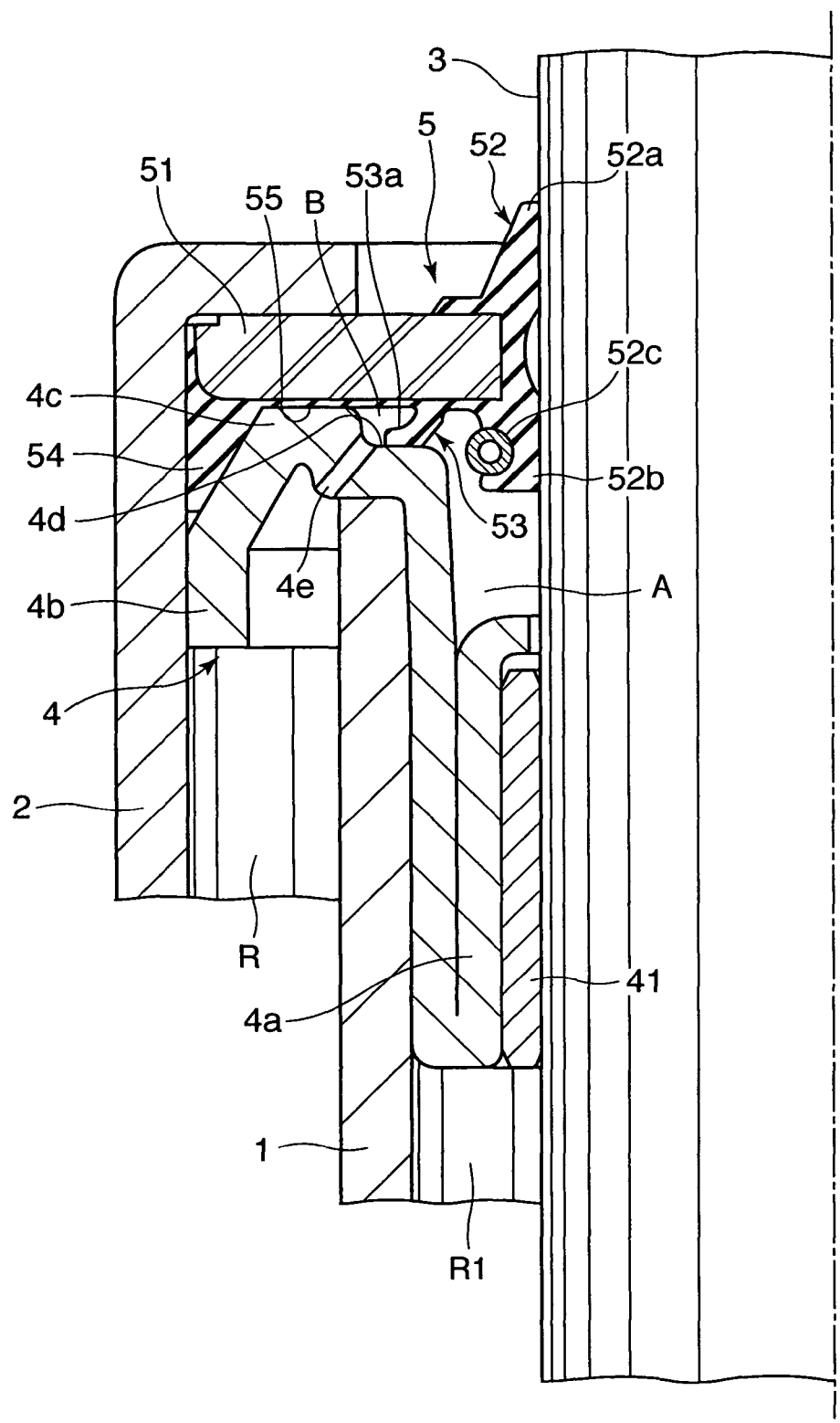
FIG. 1 is a longitudinal sectional view of essential parts of a hydraulic shock absorber to which a check seal structure according to this invention is applied.

Referring to FIG. 1 of the drawings, a double-tube type hydraulic shock absorber for a vehicle comprises an outer tube 2 and a cylinder 1 disposed coaxially in the outer tube 2. A piston rod 3 is connected to a piston enclosed in the cylinder 1 and protrudes axially from the cylinder 1 and the outer tube 2.

An oil chamber R1 enclosing working oil is formed in the cylinder 1 around the piston rod 3. An oil reservoir R enclosing working oil and gas is formed in a space having a ring-shaped cross-section between the outer tube 2 and the cylinder 1.

A rod guide 4 is fixed to upper ends of the cylinder 1 and the outer tube 2 so as to close the upper ends of the outer tube 2 and the cylinder 1 and support the piston rod 3. The rod guide 4 comprises an inner guide portion 4a, an outer guide portion 4b and a crown 4c connecting the inner guide portion 4a and the outer guide portion 4b, The inner guide portion 4a is formed in a cylindrical shape and disposed between the piston rod 3 and the outer periphery of the cylinder 1. The outer periphery of the inner guide portion 4a fits the inner periphery of the cylinder 1. A cylindrical bushing 41 is fitted into the inner periphery of the inner guide portion 4a so as to serve as a bearing for the piston rod 3. Since the piston rod 3 is lubricated by working oil in the reservoir R, an oil film is formed on the outer periphery of the piston rod 3. This oil film makes the piston rod 3 slide smoothly through the bushing 41.

The outer guide portion 4b is fitted into the inner periphery of the outer tube 2. A conical inclined surface is formed on the upper end of the outer guide portion 4b.

A seal surface 4d is formed on the crown 4c of the rod guide 4 in the vicinity of the inner guide portion 4a via a step. An upper end of the cylinder 1 abuts against the rear face of the crown 4c. The rod guide 4 is made of a steel plate bent into a specific shape. A drain port 4e penetrates the crown 4c on the outside of the seat surface 4d.

According to the construction described above, the rod guide 4 closes the oil chamber R1 and the oil reservoir R, respectively, and allows the piston rod 3 to project from the cylinder 1 and the outer tube 2 by supporting the piston rod 3 via the bushing 41 so as to be free to slide.

In this hydraulic shock absorber, the cylinder 1 and the outer tube 2 engage with a vehicle wheel axle while the piston rod 3 engages with a vehicle body. The respective lower ends of the cylinder 1 and the outer tube 2 are closed. Another oil chamber is formed in the cylinder 1 below the piston together with the oil chamber R1 formed above the piston. The oil chamber R1 formed above the piston and the oil chamber formed below the piston communicate with each other via a damping valve installed in the piston. The oil reservoir R and the oil chamber formed below the piston 1 communicate with each other via a damping valve installed in the bottom of the cylinder 1. An inert gas such as nitrogen gas is enclosed in the oil reservoir R together with working oil.

A seal assembly 5 is provided above the rod guide 4. The seal assembly 5 is fitted onto a ring-shaped metal insert 51. The metal insert 51 is gripped vertically between the upper end of the outer tube 2, which is bent inward by caulking, and a crown 4c of the rod guide 4.

The seal assembly 5 comprises an inner seal 52 which protrudes further inward from the inner periphery of the metal insert 51, a check seal 53 which protrudes towards the seat surface 4d located below the metal insert 51, a wedge-shaped outer seal 54 which protrudes downward from the outer periphery of the metal insert 51 and fills a space between the conical inclined surface of the outer guide portion 4b of the rod guide 4 and the outer tube 2, and a membrane part 55 which spreads over the lower surface of the metal insert 51 so as to connect the inner seal 52, the check seal 53, and the outer seal 54. The seal assembly 5 is constituted by a rubber material.

The inner seal 52 comprises a dust lip 52a which is in contact with the piston rod 3 in a location higher than the metal insert 51 and an oil lip 52b which is in contact with the piston rod 3 in a location lower than the metal insert 51. The dust lip 52a has a roll to prevent dust adhered to the piston rod 3 from being brought into the cylinder 1 during a contraction stroke of the piston rod 3. The oil lip 52b has a roll to scrape off working oil adhered to the piston rod 3 so that the working oil is not brought outside from the cylinder 1 when the piston rod 3 performs an elongation stroke. A garter spring 52c is fitted onto the outer periphery of the oil lip 52b so as to bias the oil lip 52b inward to generate a contact force between the oil lip 52b and the piston rod 3.

When assembling the hydraulic shock absorber, the piston rod 3, the piston, the cylinder 1, the outer tube 2, and the rod guide 4 are assembled first, and then the metal insert 51 to which the seal assembly 5 is fitted is disposed on the rod guide 4. The upper end of the outer tube 2 is finally bent inward by caulking such that the upper end of the outer tube 2 and the crown 4c of the rod guide 4 grip the metal insert 51 vertically.

In the seal assembly 5 thus fitted to the hydraulic shock absorber, the outer seal 54 invades between the conical inclined surface of the outer guide portion 4B of the rod guide 4 and the outer tube 2 so as to prevent working oil in the oil reservoir R from leaking to the outside from a contacting part between the outer tube 2 and the outer guide portion 4b of the rod guide 4.

The seal assembly 5 also causes the check seal 53 to be seated on the seat surface 4d and causes the dust lip 52a and the oil lip 52b to be in contact with the piston rod 3, respectively. As a result, an oil pool having a ring-shaped cross section is formed around the piston rod 3 by the inner guide portion 4a of the rod guide 4, the oil lip 52b, and the check seal 53. The oil pool A also functions as an operation space for the oil lip 52b. A space B is formed by the crown 4c of the rod guide 4, the step in the crown 4c, the seat surface 4d, and the membrane part 55 so as to face the drain port 4c on the opposite side of the oil reservoir R.

The check seal 53 provided between the oil pool A and the space B comprises an annular lip 53a which is seated resiliently on the seat surface 4d of the rod guide 4 from above in a state where a tip of the annular lip 53a points outward. Gas pressure in the oil reservoir R exerts a downward force on the annular lip 53a in the space B.

According to this construction, the check seal 53 functions to allow working oil to flow from the oil pool A to the space B when the pressure in the oil pool A becomes high while preventing working oil from flowing from the space B into the oil pool A.

In the elongation stroke of the piston rod 3, when the piston rod 3 protrudes axially from the cylinder 1 and the outer tube 2 to the outside, the working oil adhered to the outer periphery of the piston rod 3 in the form of an oil film is scraped off by the oil lip 52b and accumulates in the oil pool A.

When a storage amount of the working oil in the oil pool A increases, the pressure in the oil pool A increases. As a result, the annular lip 53a of the check seal 53 lifts from the seat surface 4d such that the oil pool A is connected to the space B through a gap formed between the annular lip 53a and the seat surface 4d. The working oil stored in the oil pool A is then discharged into the oil reservoir R via the space B and the drain port 4e. The working oil discharged into the oil reservoir R is prevented from returning to the oil pool A by a reverse flow prevention function of the check seal 53.

Figure 2:
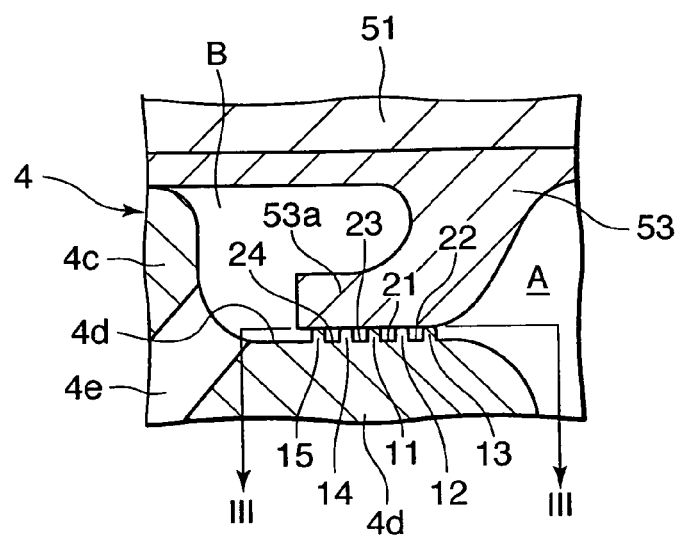
FIG. 2 is an enlarged longitudinal sectional view of the check seal structure.

Next, referring to FIGS. 2-4, a shape of the seat surface 4 formed on the crown 4c of the rod guide 4, on which the annular lip 53a of the check seal 53 is seated, will be described.

Five ribs 11-15 taking the form of coaxial circles and projecting upward are formed on the seat surface 4d so as to be in contact with the annular lip 53a of the check seal 53.

Figure 4:
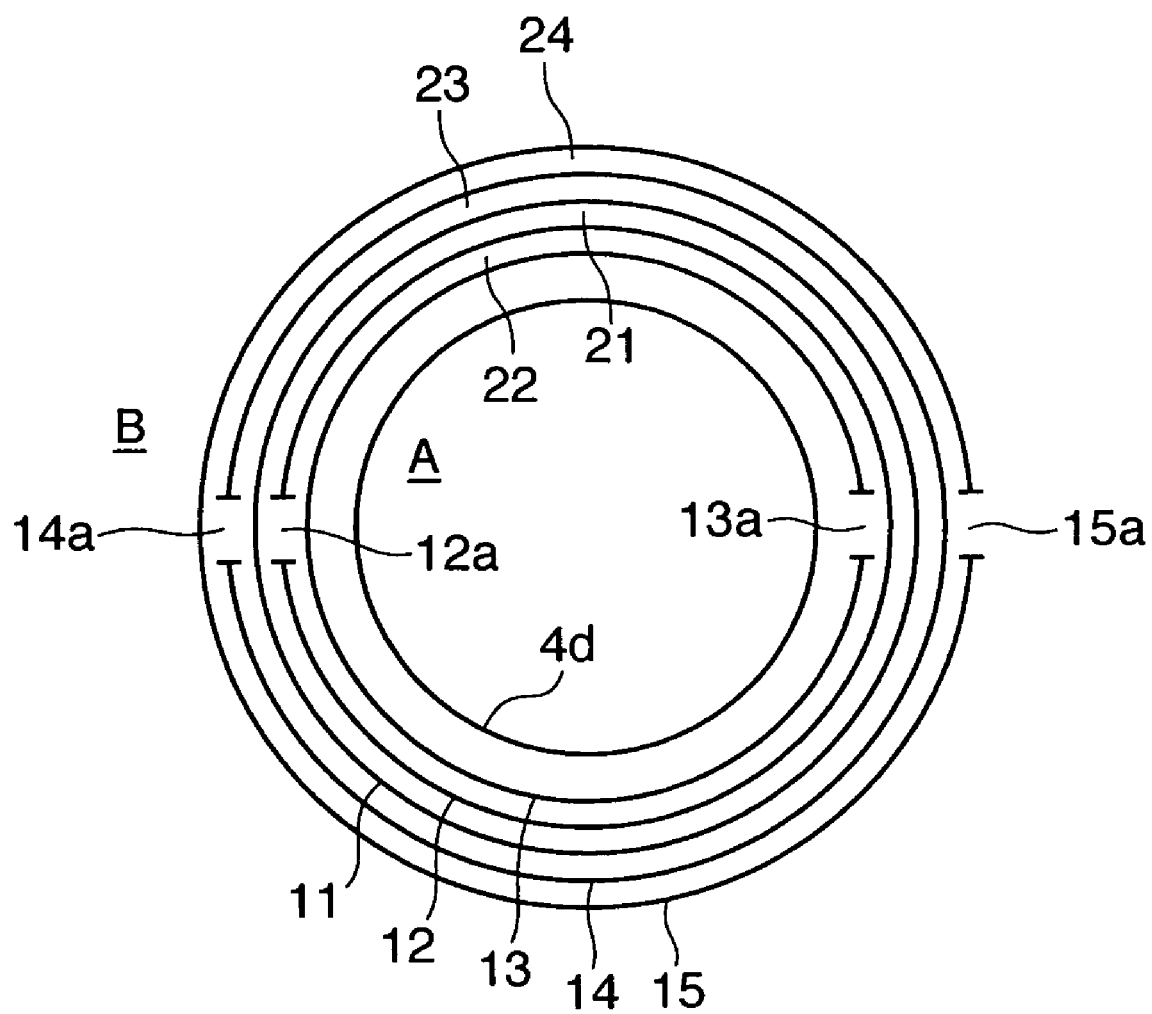
FIG. 4 is a schematic plan view of ribs according to this invention.

Referring to FIG. 4, a main rib 11 located in the midst of the five ribs 11-15 is formed continuously to cover the entire circumference of the seat surface 4d. The annular lip 53a of the check seal 53 is therefore in contact with the main rib 11 over the entire circumference thereof. The inner ribs 12 and 13 are disposed on the inner side of the main rib 11, and the outer ribs 14 and 15 are disposed on the outer side of the main rib 11. An annular groove 22 is formed between the inner ribs 12 and 13, an annular groove 21 is formed between the main rib 11 and the inner rib 12, an annular groove 23 is formed between the main rib 11 and the outer rib 14, and an annular groove 24 is formed between the outer ribs 14 and 15.

Figure 3:
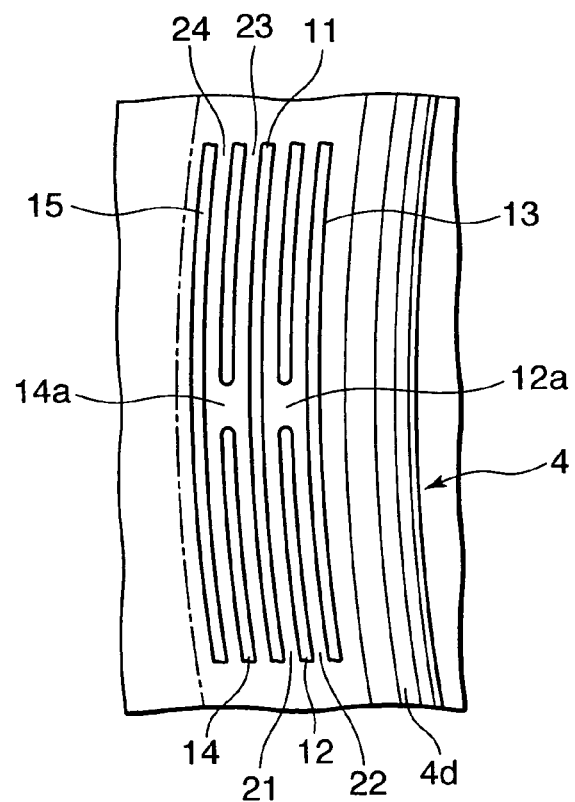
FIG. 3 is an enlarged plan view of a seat surface of a rod guide seen along a line III-III in FIG. 2.

Referring to FIG. 3, a notch 12a and a notch 14a are formed in the inner rib 12 and the outer rib 14, respectively, at an identical angular position.

Referring again to FIG. 4, notches 13a and 15a are formed in the inner rib 13 and the outer rib 15, respectively, on the opposite side of the notches 12a and 14a.

According to the construction described above, the notches 12a and 13a function as pressure introducing passages so as to exert the pressure in the oil pool A on the annular lip 53a from inside. Specifically, the notch 13a functions to introduce the pressure in the oil pool A into the annular groove 22 while the notch 12a functions to introduce pressure in the annular groove 22 into the annular groove 21, in a state where the annular lip 53a of the check seal 53 is seated on the seat surface 4d.

When the pressure in the oil pool A increases, an increased pressure is introduced into the annular groove 22 and the annular groove 21 via the notches 13a and 12a in a state where the annular lip 53a of the check seal 53 is seated on the seat surface 4d. Since only the main rib 11 of the seat surface 4d is in contact with the annular lip 53a over the entire circumference, the contact between the annular lip 53a and a seat surface 4d is so-called line contact. As a result, the pressure in the oil pool A acts upward on a large area of the annular lip 53a on the inside of the main rib 11. Therefore, the check seal 53 lifts responsively to an increase in the pressure in the oil pool A.

On the other hand, the notches 14a and 15a function as pressure releasing passages so as to release the pressure on the inside of the main rib 11 to the space B when the annular lip 53a of the check seal 53 lifts off from the main rib 11. Specifically, the notch 14a releases the pressure in the annular groove 23 to the annular groove 24. The notch 15a releases the pressure in the annular groove 24 to the space B. The pressure releasing passages release the pressure in the oil pool A to the space B immediately when the annular lip 53a is about to lift off the main rib 11, thereby accelerating the annular lip 53a to lift off the main rib 11.

As described above, by forming pressure introducing passages and pressure releasing passages in the seat surface 4d on which the annular lip 53a of the check seal 53 is seated, a response of the check seal 53 with respect to an increase in the pressure in the oil pool A is improved. Further, since the pressure in the oil pool A is released promptly, pressure variation in the oil pool A is suppressed to be small and variation in the friction which the oil lip 52b exerts on the piston rod 3 is also suppressed to be small. As a result, the hydraulic shock absorber exhibits a smooth stroke.

When on the other hand the annular lip 53a of the check seal 53 is seated on the seat surface 4d, the annular lip 53a and the main rib 11 are in line contact and the contact pressure between the annular lip 53a and the main rib 11 is higher than in a case where the entire surface of the annular lip 53a is in contact with the seat surface 4d, or in other words they are in full contact. As a result, the performance to prevent working oil from flowing in the opposite direction, from the space B to the oil pool A, is also enhanced.

The contents of Tokugan 2007-276085, with a filing date of Oct. 24, 2007 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

In the embodiment described above, both the pressure introducing passages and the pressure releasing passages are formed in the seat surface 4d. However, a considerable effect is obtained by providing only the pressure releasing passages.

The form of the pressure introducing passages and the pressure releasing passages is not limited to a notch. For example, the pressure introducing passages and the pressure releasing passages can be implemented by making the height of the ribs 12-15 slightly lower than the height of the main rib 11.

This invention is not limited by the number of the ribs. For example, only one rib may be provided on the inner side. Similarly, only one rib may be provided on the outer side of the main rib 11. The number of the notches and the location thereof are also not limited to the embodiment described above and may be set arbitrarily.

The rod guide 4 may be formed by molding or forging other than bending a steel plate.

The embodiments of this invention in which an exclusive property or privilege is claimed are defined as follows:

What is claimed is:

1. A check seal structure for a hydraulic shock absorber for discharging working oil in an oil pool which temporarily stores working oil scraped off a piston rod, to an oil reservoir located outside the oil pool while preventing working oil from flowing into the oil pool from the oil reservoir, comprising:
an annular seat surface formed on the outside of the oil pool;
an annular lip seated resiliently on the seat surface in a state where a tip of the annular lip points outward;
a main rib having a circular form and projecting from the seat surface towards the annular lip;
an inner rib provided on the inside of the main rib and projecting from the seat surface towards the annular lip, the main rib and the inner rib forming an annular groove therebetween; and
a notch formed in the inner rib to introduce a pressure in the oil pool into the annular groove.

2. The check seal structure as defined in claim 1, further comprising a further inner rib on the inside of the inner rib, the inner rib and the further inner rib forming a further annular groove therebetween.

3. The check seal structure as defined in claim 2, wherein a further notch is provided in the further inner rib, and the notch and the further notch are located in different angular positions.

4. The check seal structure as defined in claim 1, further comprising an outer rib provided on the outside of the main rib and projecting from the seat surface towards the annular lip, the main rib and the outer rib forming an annular groove therebetween, and a pressure releasing notch which releases a pressure in the annular groove between the main rib and the outer rib to the outside of the outer rib.

5. The check seal structure as defined in claim 4, further comprising a further outer rib on the outside of the outer rib, the outer rib and the further outer rib forming a further annular groove therebetween.

6. The check seal structure as defined in claim 5, wherein a further pressure releasing notch is provided in the further outer rib, and the pressure releasing notch and the further pressure releasing notch are located in different angular positions.

7. The check seal structure as defined in claim 1, wherein the hydraulic shock absorber comprises a cylinder from which the piston rod projects, a rod guide which supports the piston rod at an open end of the cylinder so as to be free to slide in an axial direction, an oil lip which scrapes working oil off the piston rod as the piston rod projects from the cylinder, and an outer tube provided on the outside of the cylinder coaxially therewith, and wherein the oil pool is formed in the cylinder whereas the oil reservoir is formed between the outer tube and the cylinder.

8. The check seal structure as defined in claim 7, wherein a drain port is formed through the rod guide so as to communicate with the oil reservoir, the annular seat surface is formed on the rod guide, and the annular lip is formed integrally with the oil lip and fitted onto a metal insert which is gripped by a tip of the inwardly bent outer tube and the rod guide, and seated on the annular seat surface between the oil pool and the drain port.

* * * * *